(No Model.) 3 Sheets—Sheet 1.
S. C. MENDENHALL.
CLEANER ATTACHMENT FOR SEEDING MACHINES.
No. 280,210. Patented June 26, 1883.
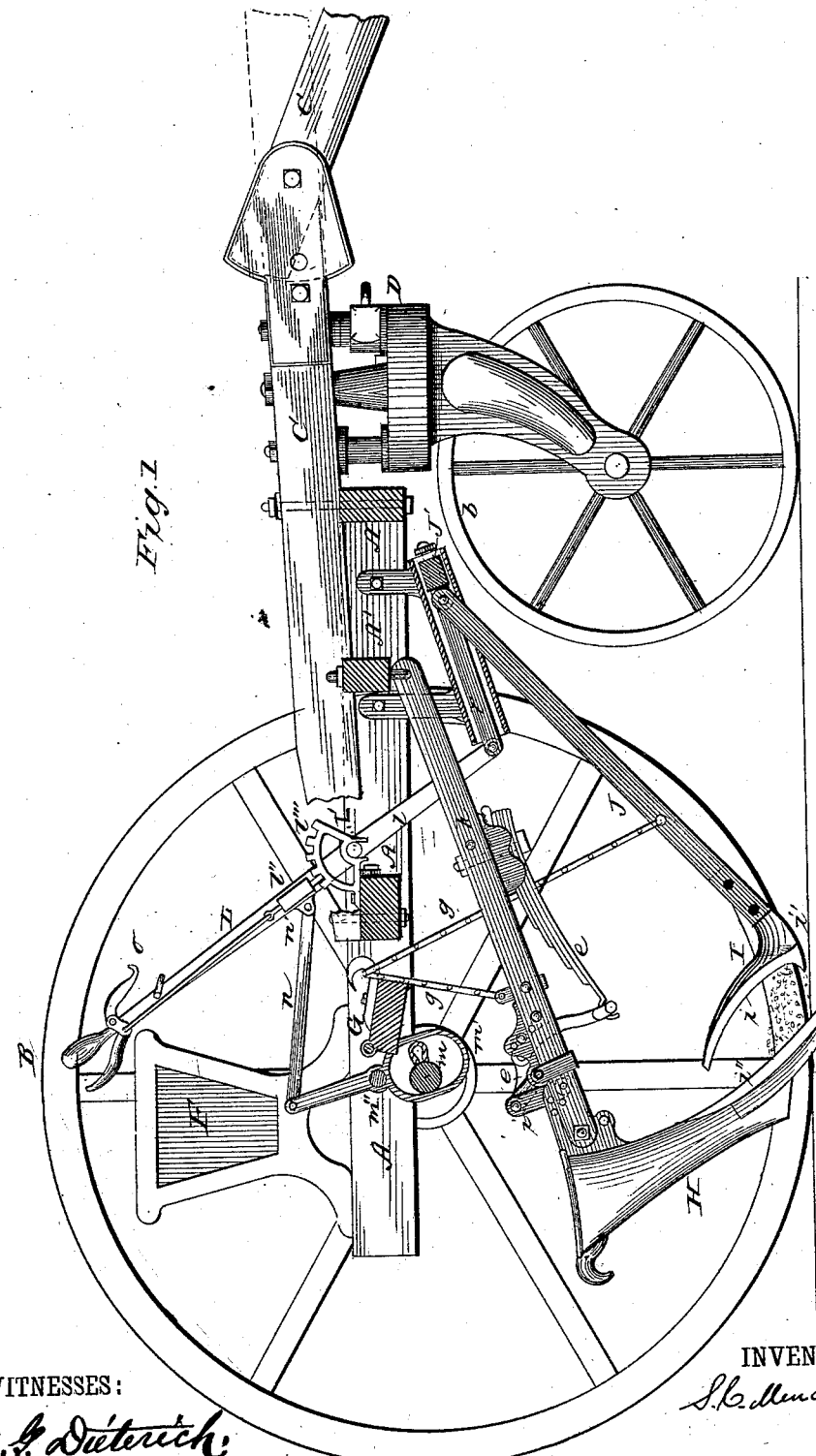
WITNESSES:
INVENTOR.
ATTORNEYS.

(No Model.) 3 Sheets—Sheet 2.
S. C. MENDENHALL.
CLEANER ATTACHMENT FOR SEEDING MACHINES.
No. 280,210. Patented June 26, 1883.
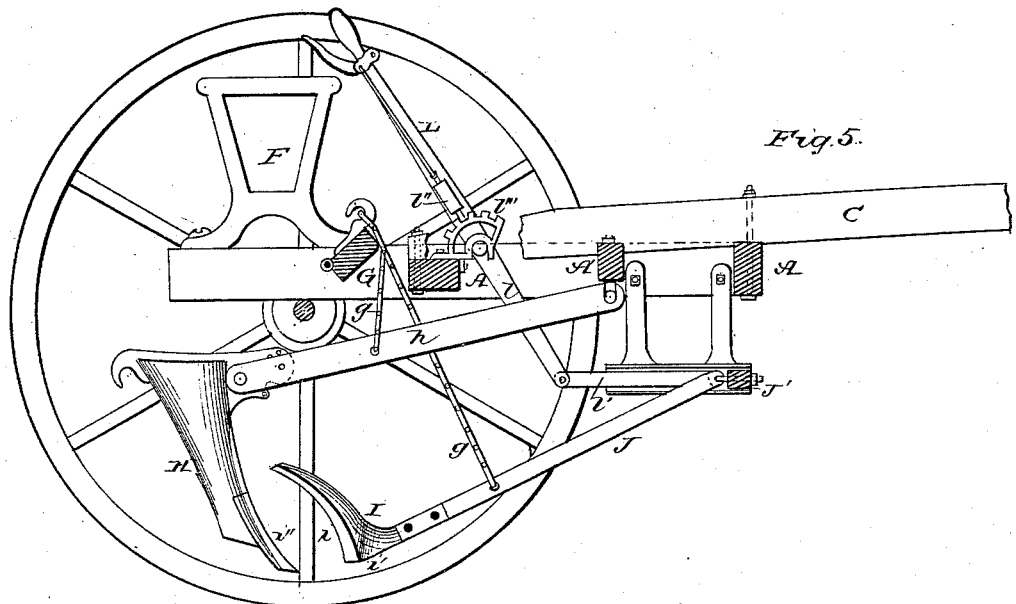
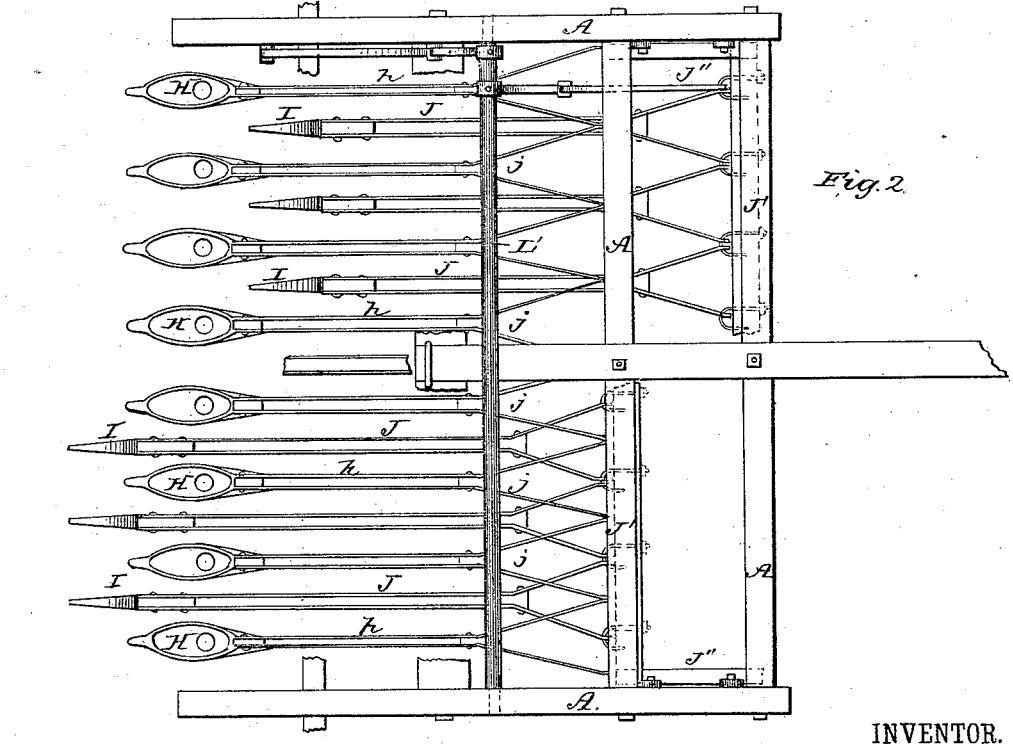
WITNESSES:
Fred. G. Dieterich
J. G. Hinkel
INVENTOR.
S. C. Mendenhall
ATTORNEYS.

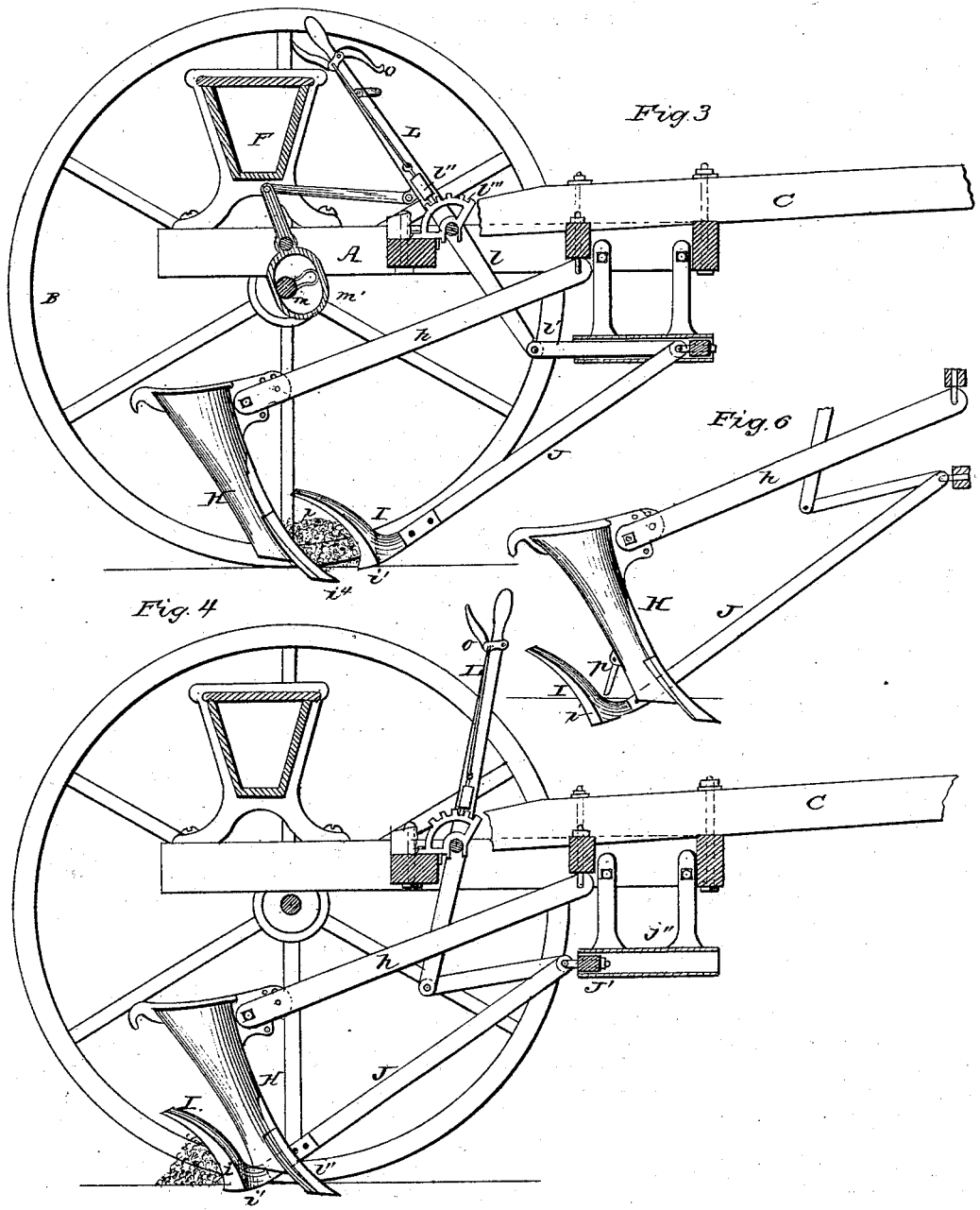

UNITED STATES PATENT OFFICE.

STEPHEN C. MENDENHALL, OF RICHMOND, INDIANA.

CLEANER ATTACHMENT FOR SEEDING-MACHINES.

SPECIFICATION forming part of Letters Patent No. 280,210, dated June 26, 1883.

Application filed August 16, 1882. (No model.)

*To all whom it may concern:*

Be it known that I, STEPHEN C. MENDENHALL, a citizen of the United States, residing at Richmond, in the county of Wayne and State of Indiana, have invented certain new and useful Improvements in Cleaner Attachments for Seeding-Machines, of which the following is a specification, reference being had therein to the accompanying drawings.

My invention relates to that class of improvements in seeding-machines known as "cleaners," and is very simple in its construction and mode of operation. It is manual in its operation, or may be constructed to operate automatically by a simple connection with the main shaft of the carrying-wheels, as hereinafter described. The cleaners proper are operated by substantially the common zigzag lever devices now in use on many of the most common make of wheat-drills.

Connected with and being a part of my cleaner device is a device for forming a drainage-furrow between each two rows of grain planted, assuming that the drill-tooth is followed by a coverer, which may be hinged to the rear lower portion of the tooth, and project obliquely from the same in such position as to refill the furrow of the tooth with fine dirt, thrown up by its action, level with the face of the ground. To form this drain-furrow, and to make it without any additional mechanism, I make the lower extremities of the cleaners of V shape, and so arrange them that in their extreme rearward position they will extend beyond and to the rear of the drill-teeth, and by their weight and peculiar shape they will form furrows between the rows of grain after they have been covered. By these devices the grain is at once covered with fine dirt level with the face of the ground to a depth suited to perfect germination, and not left partly covered in an open furrow, where the water may stand and injure the seed, and when passing away leave the soil in a hard, compact condition, unfavorable to germination; secondly, the drainage-furrows made by the cleaners retain or conduct away the surplus surface water. This use of my cleaners does not lessen the primary object of my invention, because when in operation in the position above described the position of the cleaner-bar in front of the drill-teeth is sufficiently elevated above the ground to allow the trash to accumulate underneath the same, and by two motions—one forward and one rearward—the forward movement brings the cleaner-cutters over and in front of the trash, followed immediately by a rearward motion, which cuts, breaks, and forces the trash rearward, and again the cleaners are in position for furrowing.

In the accompanying drawings, Figure 1 is a side elevation, partly in section, of a drilling-machine containing my improvements, and also showing my improved caster and tongue device, and my new spring attachment for drill-tooth and drag-bar, for which applications for patents are now pending. Fig. 2 is a plan view of a drilling-machine containing the improvements which constitute my present invention. Fig. 3 is an elevation of the same, partly in section, showing the cleaner in its extreme forward position. Fig. 4 is a similar view, showing the cleaner in its extreme rearward position. Fig. 5 is a similar view, showing the cleaner and drill-tooth lifted clear out of the ground. Fig. 6 is a detail view of a cleaner and drill-tooth with a coverer hinged to the rear part of latter and the cleaner making its furrow in the rear of the drill-tooth.

A is the main frame of the machine.

B is one of the main carrying-wheels, and *b*, Fig. 1, is a caster-wheel supporting the front part of the machine.

C, Fig. 1, represents the tongue, and *c* my improved jointed tongue.

D, Fig. 1, represents my improved caster-wheel saddle and its attachment to the tongue, and *e e e*, Fig. 1, represent my new spring attachment for drill-tooth and drag-bar. Said parts marked *b*, C, D, and *e e e*, however, form no part of my present invention.

F represents the seed-hopper, and G a rack-bar for raising the cleaners and drill-teeth out of the ground by means of chains *g g*; and it may be operated by any of the various devices now in use for that purpose.

H is a drill-tooth or hoe pivoted to drag-bar *h*, which is hinged to cross-bar A' of the main frame.

I is a cleaner, having a curved cutting-edge, $i$, and a V-shaped heel, $i'$, for forming a drainage-furrow. This cleaner or colter is rigidly attached to a double push-bar, J, which is hinged to a sliding cross-bar, J', by a Y-shaped connection, $j$. The drill-tooth or hoe may also have a sharp cutting-edge in front, as shown at $i''$. Said sliding cross-bar J' is moved forward and backward in suitable ways at each side of the main frame $j''\ j''$ by a lever, L, rigidly attached to a rack-shaft, L', having two cranks, $l$, one at each end, (only one being shown in the drawings, Fig. 1,) each hinged to a pitman, $l'$, which at its other end is hinged to the sliding cross-bar J'. Said lever L is secured in any desired position in its movement by means of a spring-catch, $l''$, engaging with a toothed sector, $l'''$. By a movement of said lever the cross-bar J' is moved forward or back, as may be desired, pushing the cleaners back between and beyond the drill-teeth by its backward movement, and drawing them forward of the drill-teeth by its forward movement.

In Fig. 2 the whole series of cleaners and drill-teeth are shown, one half of the cleaners being represented in their extreme forward position and the other half in their extreme rearward position, the sliding cross-bar J' being represented as broken in the center, though in practice said bar is never thus divided, and all the cleaners move backward and forward together.

Certain devices, by means of which the cleaners are made to move forward and backward automatically, are shown in Fig. 1, and will now be described.

On the axle of the main carrying-wheels is an eccentric, $m$, embraced by a collar, $m'$, on a lever fulcrumed on the main frame at $m''$, and to the upper end of this lever is pivoted a pitman, $n$, which is pivoted at the other end to the lever L at $n'$. When arranged to operate automatically, the spring-catch on the lever L is drawn up, so as to disengage it from the toothed sector, and secured in that position by a latch, $o$, or any suitable device for that purpose. Then, as the axle rotates, the eccentric $m$ will cause the sliding bar J', carrying the cleaners, to move forward and backward automatically by a reciprocating movement.

In Fig. 6, which represents the cleaner in position for forming a drainage-furrow, a coverer is shown at $p$.

In using the machine on ground that is only encumbered by trash that will readily yield to the pressure of the cleaners the automatic devices may be used; but if the trash is of such a nature that it will not readily yield nor pass between the teeth the hand-lever will be used to the best advantage.

It will be seen by the drawings that the push-bars, to which the cleaners or colters are affixed, are hinged to the sliding bar J' in such manner that each can rise or fall to accommodate itself to any unevenness of the ground independently of all the others.

Having thus fully described my invention and its mode of operation, what I claim is—

1. In a seeding-machine with drill-teeth or hoes, a series of cleaners or cutting-colters, formed as described, with mechanism to push the same from in front of the drill-teeth rearward between and beyond the same, the cleaners being constructed with wedge-shaped heels, to make blank furrows between the rows of grain planted, substantially as and for the purpose set forth.

2. In a seeding-machine with drill-teeth or hoes, as described, a series of colters with rearward cutting-edges to pass from in front of the drill-teeth rearward between and beyond the same, in combination with cutting-edges on the drill-teeth, to assist the colters in cutting and breaking the "trash," substantially as described.

3. In a seeding-machine, the lever L, fulcrumed on frame by rock-shaft L', said lever connected at its lower end to pitman $l'$, said pitman being attached to push-bar J and cross-bar J', substantially as shown.

4. In a seeding-machine with drill-teeth, a series of furrowing-colters, formed as described, operating substantially in line between the drill-teeth, and independently of the same, the drill-teeth being followed by coverers, substantially as specified.

5. In a seeding-machine with drill-teeth, the combination of the lever L, rock-shaft L', cranks $l$, pitmen $l'$, sliding bar J', push-bars J, and cleaners or colters I, all constructed and arranged to operate substantially as described.

6. The reciprocating cleaners or colters I, with heels $i'$, shaped to form drainage-furrows between the rows of grain, substantially as shown and described.

7. In combination with the reciprocating cleaners I and the mechanism herein described for operating the same manually, the eccentric $m$, lever $m'$, and pitman $n$, constructed and arranged to operate said cleaners automatically, substantially as described.

In testimony whereof I affix my signature in presence of two witnesses.

STEPHEN C. MENDENHALL.

Witnesses:
 T. D. D. OURAND,
 J. J. COOMBS.